United States Patent
Ray et al.

(10) Patent No.: US 9,241,316 B1
(45) Date of Patent: Jan. 19, 2016

(54) SYSTEM AND PROCEDURE TO REDUCE THE POWER CONSUMPTION OF A MOBILE DEVICE THROUGH AUTOMATED DISABLING OF RF FILTERS

(71) Applicant: Sprint Spectrum L.P., Overland Park, KS (US)

(72) Inventors: Amar Nath Ray, Shawnee, KS (US); Douglas L. Richards, Stillwell, KS (US); Robert Butler, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 293 days.

(21) Appl. No.: 13/968,009

(22) Filed: Aug. 15, 2013

(51) Int. Cl.
*G08C 17/00* (2006.01)
*H04W 52/02* (2009.01)

(52) U.S. Cl.
CPC .................................. *H04W 52/0261* (2013.01)

(58) Field of Classification Search
CPC .................... H04W 52/0261; H04W 52/0293; H04W 52/0277; H04W 52/0264; H04W 52/0274; G06F 1/3206; G06F 1/3212
See application file for complete search history.

(56) References Cited

U.S. PATENT DOCUMENTS

| | | | | |
|---|---|---|---|---|
| 7,130,667 B2 * | 10/2006 | Jin et al. | | 455/574 |
| 7,346,368 B2 * | 3/2008 | Llanos et al. | | 455/550.1 |
| 7,848,776 B2 * | 12/2010 | Akiba et al. | | H04W 52/0277 370/311 |
| 8,213,974 B2 * | 7/2012 | Jarabek | | H04W 88/06 370/252 |
| 8,306,238 B2 * | 11/2012 | Siotis | | 381/77 |
| 8,615,398 B2 * | 12/2013 | Sampat et al. | | 704/501 |
| 8,837,386 B2 * | 9/2014 | Ekici et al. | | H04W 48/18 370/230 |
| 8,854,976 B2 * | 10/2014 | Xi et al. | | H04L 5/001 370/225 |
| 8,886,261 B2 * | 11/2014 | Aerrabotu | | H04B 1/406 455/343.5 |
| 9,008,580 B2 * | 4/2015 | Kumar | | 455/41.2 |
| 2004/0247993 A1 * | 12/2004 | Johnson et al. | | 429/50 |

* cited by examiner

*Primary Examiner* — Brian O'Connor

(57) ABSTRACT

Methods and systems are provided for conserving resources of a wireless communication device (WCD). A WCD may be configured to operate in one of two modes while in communication with the RAN. In a high-power mode, the WCD operates with a filtering component having a first filtering bandwidth. The first a filtering bandwidth generally enables the WCD to provide high quality audio signals based on a first audio bandwidth of an audio codec. In a low-power mode, the WCD operates with the filtering component having a second filtering bandwidth. The second filtering bandwidth enables the WCD to provide a lower quality audio signal based on a second audio bandwidth having a narrower audio bandwidth than the first audio bandwidth.

19 Claims, 6 Drawing Sheets

SYSTEM AND PROCEDURE TO REDUCE THE POWER CONSUMPTION OF A MOBILE DEVICE THROUGH AUTOMATED DISABLING OF RF FILTERS

BACKGROUND

To provide cellular wireless communication service, a wireless service provider or "wireless carrier" typically operates a radio access network (RAN) that defines one or more coverage areas in which wireless communication devices (WCDs) can be served by the RAN and can thereby obtain connectivity to broader networks such as the public switched telephone network (PSTN) and the Internet. A typical RAN may include one or more base stations (e.g., base transceiver stations, eNodeBs, access nodes, access points, etc.), each of which may radiate to define a cell and cell sectors in which WCDs can operate. Further, the RAN may include supplementary network infrastructure (e.g., controllers, mobility management entities, etc.), which may be integrated with or otherwise in communication with the various base stations. The supplementary network infrastructure may include, or be in communication with, a switch or gateway that provides connectivity with one or more transport networks. With this or other arrangements, a cell phone, personal digital assistant, wirelessly equipped computer, or any other WCD that is positioned within coverage of the RAN can then communicate with a base station and in turn, via the base station, with other served devices or with other entities on the transport network.

OVERVIEW

A WCD may be configured to operate in one of two modes while in communication with the RAN. In the first mode, known as a high-power mode, the WCD operates with a filtering component of the WCD having a first filtering bandwidth. The first filtering bandwidth generally enables the WCD to provide high quality audio signals based on a first audio bandwidth of a first audio codec. In the second mode, known as a low-power mode, the WCD operates with the filtering component of the WCD having a second filtering bandwidth. The second filtering bandwidth generally enables the WCD to provide a lower quality audio signal, based on a second audio bandwidth of a second codec, compared to the first filtering bandwidth. The second filtering bandwidth enables the WCD to provide a lower quality audio signal based on the second filtering bandwidth having a narrower filtering bandwidth than the first filtering bandwidth.

Signals received by the WCD from the RAN will have an associated radio-frequency (RF) bandwidth based on the operating mode of the WCD. A filtering component located in a receiver of the WCD filters signals received by the WCD and adjusts a filtering bandwidth based on the respective RF bandwidth of the received signals. To adjust the filtering bandwidth of the filtering component, the WCD may selectively enable or disable at least one of multiple filters contained within the filtering component. Thus, the WCD can adjust the filtering bandwidth of the filtering component based on the operating mode of the WCD. When the filtering bandwidth is narrowed (e.g., the WCD switches to operating in the second mode), the WCD may responsively disable a subset of the filters contained within the filtering component. Because each enabled filter consumes battery power, disabling a subset of the filters helps to conserve WCD battery life.

The WCD may generally operate in the first mode; however, the WCD may switch to operate in the second mode based on a remaining battery charge in the battery of the WCD. Thus, the WCD may switch to the second mode with the narrower filtering bandwidth in an attempt to preserve the remaining battery charge. Additionally, the WCD may switch between the first mode and the second mode during an ongoing communication session of the WCD. In another embodiment, the WCD may receive an instruction to switch to the second mode. In this embodiment, in response to receiving the instruction to switch to the second mode, the WCD will switch to the second mode with the narrower filtering bandwidth. In one example, the WCD may have a user-controlled toggle configured to allow a user of the WCD to instruct the WCD to switch between the first mode and the second mode. In another example, the RAN may communicate a signal to the WCD to switch between the first mode and the second mode.

In some embodiments, the WCD also includes an override indicator. When the WCD detects the override indicator, the WCD operates in the first mode regardless of the either the battery charge or receiving a switching instruction. Thus, the override indicator forces the WCD to operate in the first mode (i.e. high-power mode) with the wider filtering bandwidth. In one example, a user may indicate a desire to operate the WCD in the first mode through a toggle on the WCD. When the user selects the toggle, the WCD creates the override indicator. In another example, the WCD creates the override indicator based on an application running on the WCD having an associated quality-of-service (QOS) requirement. If the QOS requirement is greater than a threshold, the WCD both creates an override indicator and stays in the first mode regardless of the battery charge. Various applications, such as games, movies, video conferencing, etc., will have an associated QOS requirement to ensure that audio components of the application are delivered with a desired quality. Thus, the override indicator prevents the WCD from switching modes and degrading the performance of the application with the associated QOS requirement.

Additionally, when the WCD switches modes, the WCD may communicate a network indicator to the RAN so that the RAN can determine an appropriate RF bandwidth and audio codec to use for communication to the WCD. If the RAN provided a signal having a wider RF bandwidth than the filtering bandwidth of the operation mode of the WCD, the communication would result in an error when the WCD attempted to decode the communication. Therefore, by communicating a network indicator to the RAN, the RAN will know the current operation mode of the WCD. By knowing the operation mode of the WCD, the RAN may provide a signal to the WCD having an RF bandwidth appropriate for the filtering bandwidth associated with the current mode of the WCD. Because each mode has a respective filtering bandwidth (and associated audio codec), for communication to occur between the RAN and the WCD, the RAN should transmit a signal having the appropriate RF bandwidth and audio codec. If the WCD does not communicate the network indicator to the RAN, the RAN may not be able to determine an appropriate RF bandwidth and/or audio codec to use for communication.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments are described herein with reference to the following drawings, wherein like numerals denote like entities.

DETAILED DESCRIPTION

1. Example Communication System Architecture

Figure 1:
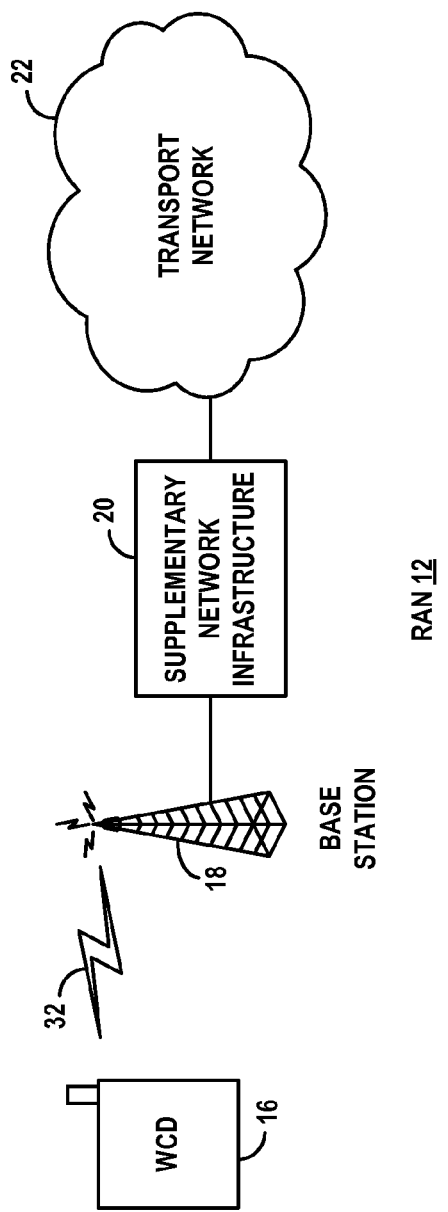
FIG. 1 depicts an example communication system.

Referring to the drawings, FIG. 1 is a simplified block diagram of a network in which at least one embodiment of this disclosure can be implemented. By way of example, the figure depicts a RAN 12 arranged to serve at least one wireless communication device (WCD) such as a representative WCD 16. These representative system arrangements are of course merely examples, and those skilled in the art will understand that numerous variations are possible, ranging from a simple wireless access point router or other such serving device to a far more complex system. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, a processor that executes program instructions stored in memory or another machine-readable medium may carry out various functions.

The RAN 12 is shown including a base station (BS) 18 and supplementary network infrastructure 20 that provides connectivity with a transport network 22 such as the public switched telephone network (PSTN) and/or the Internet. In the disclosed representative system, the BS includes one or more antennas or antenna arrangements that radiate to define one or more air-interface coverage areas, such as cells or cell sectors, in which WCDs can communicate with the BS. FIG. 1 conceptually depicts a representative coverage area 32 provided by RAN 12.

The supplementary network infrastructure may be connected with, and control, one or more BSs and may manage various aspects of air-interface operation, such as handoffs between BSs or the like. Further, in some systems, a radio network controller or other such component provides similar functionality.

The supplementary network infrastructure may include a switch/gateway that may be connected with one or more controller components. The controller components may manage functions such as handoffs between various coverage areas. Further, the switch/gateway may provide connectivity with a transport network. For instance, a switch such as a switching center or gateway may provide connectivity with the PSTN, and a gateway may provide connectivity with a packet-switched network such as the Internet.

Communications in a given coverage area between a representative BS and WCDs such as WCD 16 may define a "forward link" in the direction from the BS to the WCD and a "reverse link" in the direction from the WCD to the BS. The BS and WCD may each be programmed or otherwise equipped to engage in such communications in accordance with an agreed air-interface protocol, examples of which include LTE, CDMA (e.g., 1xRTT or 1xEV-DO), AMPS, AMPA, GPRS, MMDS, UMTS, EDGE, WiMAX (e.g., IEEE 802.16), iDEN, LTE, GSM, TDMA, microwave, satellite, Wi-Fi (e.g., IEEE 802.11), Bluetooth, and others now known or later developed. A given air interface may define a number of discrete communication channels through a time-division multiplexing, code-division multiplexing, frequency-division multiplexing, and/or another mechanism now known or later developed.

On the forward link in each coverage area, a typical air interface protocol may define a pilot signal that WCDs can detect as an indication of the presence of the coverage area and that WCDs can measure as a basis to determine the quality and sufficiency of available coverage. Each pilot signal may include or embody (e.g., be based on) an identifier of the coverage area, so that when a WCD detects the pilot signal, the WCD can associate the pilot signal with a particular coverage area. Further, the forward link may also define other air-interface channels, such as broadcast control channels that provide data defining operational parameters for the coverage area, paging channels through which the BS can direct control messages to particular WCDs, and traffic channels through which the BS can transmit bearer traffic (e.g., voice data, audio data, or other data) to served WCDs.

The reverse link in each coverage area may then likewise define various channels, such as access channels through which WCDs can transmit to the BS access probes that define origination requests, registration requests or the like, and traffic channels through which WCDs can transmit bearer traffic to the BS.

2. Example Network Device

Figure 2:
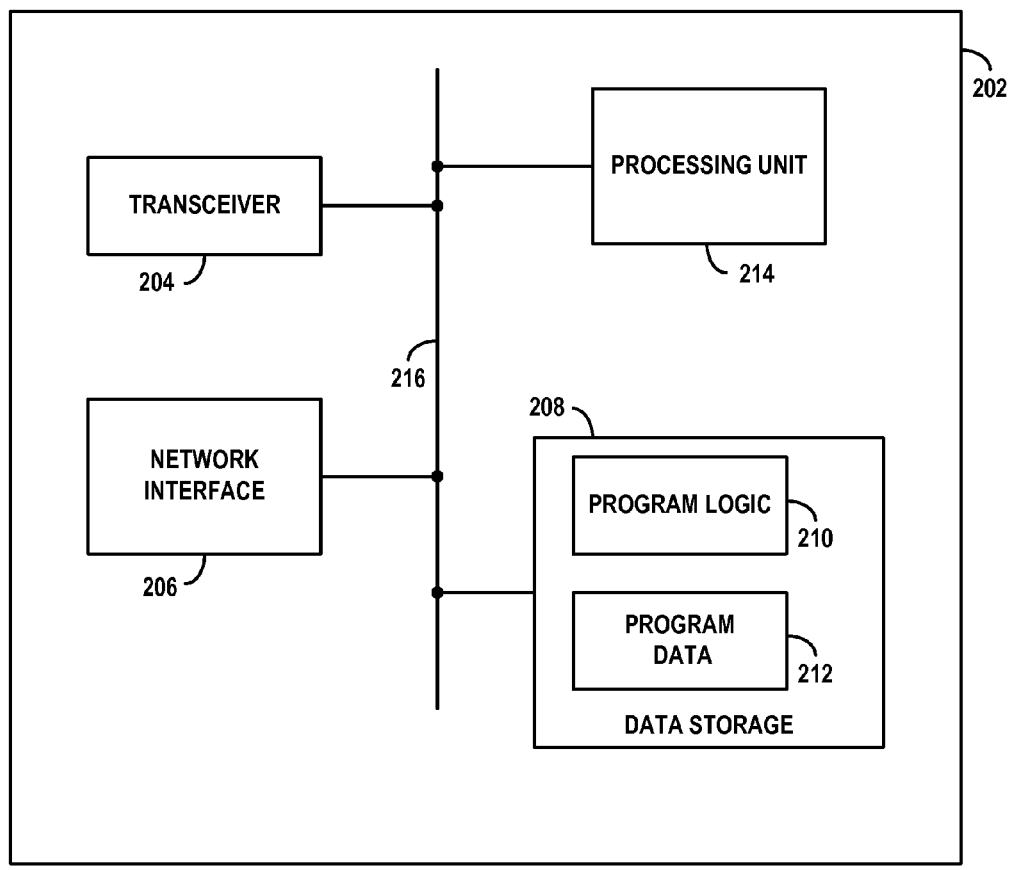
FIG. 2 depicts an example network device.

FIG. 2 is a simplified block diagram depicting functional components of an example network device 202 arranged to carry out some of the functions described herein. The example network device 202 may be representative of BS 18, supplementary network infrastructure 20, supplementary network infrastructure 20 integrated with BS 18, or some other entity associated with transport network 22 in FIG. 1, for instance. As shown in FIG. 2, network device 202 includes a transceiver 204, network interface 206, a processing unit 214, and data storage 208, all of which may be coupled together by a system bus 216 or other mechanism. In addition, the network device may also include external storage, such as magnetic or optical disk storage, although this is not shown in FIG. 2.

These components may be arranged to support conventional operation of BS 18 and supplementary network infrastructure 20 in an LTE-compliant wireless-communication network, such as network 12 illustrated in FIG. 1. The details of such an arrangement and how these components function to provide conventional operation are well-known in the art and are not described further herein. Certain aspects of network device 202 relevant to the functions discussed herein are discussed briefly below.

Network interface 206 in combination with transceiver 204, which may include one or more antennas, enables communication on a network, such RAN 12. Accordingly, network interface 206 may take the form of trunk or optical link that can be coupled with a switch/gateway of supplementary network infrastructure 20, or any Ethernet network interface card or other physical connection that can be coupled with any other entity on the RAN 12 or transport network 22, for instance. Further, network interface 206 in combination with transceiver 204 enables air-interface communication with one or more WCDs, supporting forward-link transmissions of protocol version messages, among other message and commands, and supporting reception reverse-link traffic on reverse links. The interface 206 may also include a module, such as a chipset that may support wireless packet-data communications according to an LTE family of protocols.

Processing unit 214 comprises one or more general-purpose processors (e.g., INTEL microprocessors) and/or one or more special-purpose processors (e.g., dedicated digital signal processor, application-specific integrated circuit, etc.). In turn, the data storage 208 comprises one or more volatile and/or non-volatile storage components, such as magnetic or optical memory or disk storage. Data storage 208 can be integrated in whole or in part with processing unit 214, as cache memory or registers for instance. As further shown, data storage 208 is equipped to hold program logic 210 and program data 212. Program logic 210 may comprise machine-language instructions that define routines executable by processing unit 214 to carry out various functions described herein.

Those skilled in the art will appreciate that there can be numerous specific implementations of a network device (e.g., a BS, MSC, eNodeB, other switch or gateway, or other entity associated with a transport network) that could be used in connection with at least one embodiment.

3. Example WCD

Figure 3:
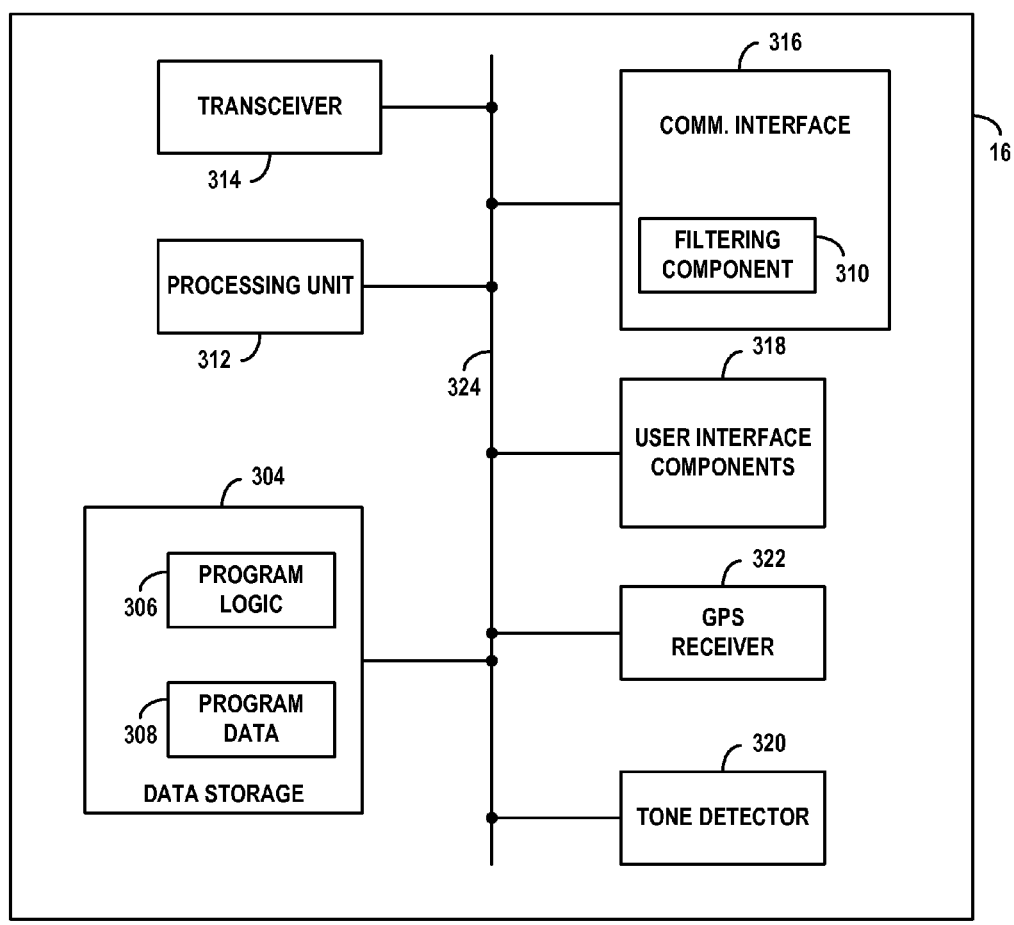
FIG. 3 depicts an example wireless communication device (WCD)

FIG. 3 is a simplified block diagram depicting functional components of an example WCD 16 that may be arranged to carry out at least one embodiment. The example WCD 16 could be or include a cell phone, a personal digital assistant (PDA), a pager, a wired or wirelessly-equipped notebook computer, and/or any other sort of device. As shown in FIG. 3, the example WCD 16 includes data storage 304, a processing unit 312, a transceiver 314, a communication interface 316, user-interface components 318, a tone detector 320, and a GPS receiver 322, all of which may be coupled together by a system bus 324 or other mechanism.

These components may be arranged to support operation of the WCD 16 in an LTE-compliant wireless-communication network, such as RAN 12 illustrated in FIG. 1. The details of such an arrangement are well known in the art and are not described further herein. Certain aspects of WCD 16 may be relevant to at least one embodiment as described herein and are discussed briefly below.

Although FIG. 3 portrays communication interface 316 and transceiver 314 as separate components, in some embodiments a single chipset may integrate both communication interface 316 and transceiver 314. Communication interface 316 in combination with transceiver 314, which may include one or more antennas, may enable communication with a network. Such communication may include the reception of data or voice communication from the serving base station and transmission of data or voice to the serving base station. The communication interface may include a module that supports wireless packet-data communications according to an LTE family of protocols, among many options. The transceiver 314 includes both a transmitter and a receiver for the WCD 16. Additionally, the transceiver 314 may include an antenna configured to send signals created by the transmitter and receive signals from a BS of a RAN. The communication interface 316 may include a baseband processor configured to control the transceiver 314. The communication interface 316 may also include a filtering component 310.

As previously discussed, the filtering component 310 is configured to filter received RF signals based on a filtering bandwidth associated with an operating mode of the WCD 16. In some embodiments, the filtering component 310 may be an integrated circuit configured to filter signals that are transmitted and/or received by the WCD 16. The filtering component 310 may have the ability to adjust the bandwidth over which frequencies are filtered. In order to adjust the bandwidth over which frequencies are filtered, the filtering component 310 may include one or more individual filters. Each individual filter may have an associated filtering bandwidth and may be individually enabled or disabled. To create a desired filtering bandwidth, a plurality of filters in the filtering component may be enabled. The filtering bandwidth is approximately equivalent to the total bandwidth of the enabled individual filters.

To adjust a filtering bandwidth of the filtering component 310, the baseband processor of the communication interface 316 may selectively enable or disable at least one of multiple filters contained within the filtering component 310. When the filtering bandwidth is narrowed, the communication interface 316 may responsively disable a subset of the filters contained within the filtering component. Because each enabled filter consumes battery power, disabling a subset of the filters may help to conserve WCD battery life.

Processing unit 312 comprises one or more general-purpose processors (e.g., INTEL microprocessors) and/or one or more special-purpose processors (e.g., dedicated digital signal processor, application specific integrated circuit, etc.). In turn, the data storage 304 comprises one or more volatile and/or non-volatile storage components, such as magnetic or optical memory or disk storage. Data storage 304 can be integrated in whole or in part with processing unit 312, as cache memory or registers for instance. In example WCD 16, as shown, data storage 304 is configured to hold both program logic 306 and program data 308. Program logic 306 and/or program data 308 may comprise machine-language instructions that define routines executable by processing unit 312 to carry out at least one embodiment as described herein. Program logic 306 may include instructions coded within a read-only memory (ROM) that cannot be changed. The program data 308 may include instructions stored in a rewritable memory that can be changed through writing to the memory.

In at least one embodiment, processing unit 312 is embedded with a wireless chipset, and thus may be part of communication interface 316.

GPS receiver 322 may be any known or hereafter-developed GPS receiver, suitable for receiving and decoding GPS signals for location and timing purposes, perhaps among other purposes; in some embodiments, WCD 16 does not have a location module such as GPS receiver 322, or has location-determination technology that takes another form.

It will be appreciated that there can be numerous specific implementations of a WCD, such as WCD 16, that may be arranged to carry out at least one embodiment as described herein. Further, given this disclosure, one of skill in the art would understand how to devise and build such an implementation.

4. Example RF Bandwidth

In one embodiment, the RF bandwidth of a communication session is a function of the data rate of the communication session. Additionally, the data rate required for a communication session may be a function of the audio bandwidth (audio bandwidth is described with respect to FIG. 5). Thus, to increase the audio bandwidth of a communication session, an associated increase in data rate may be required. Further, an increase in data rate may also require a corresponding increase in RF bandwidth. Therefore, to increase the audio bandwidth, the WCD may request a data rate increase (or an RF bandwidth increase) from the BS.

To increase the data rate, the BS may responsively assign more RF bandwidth to the WCD for each time period during the communication session to facilitate the data transfer. Thus, a WCD receiving a wideband audio transmission may receive a communication with a wider RF bandwidth (as compared to a narrow-bandwidth audio transmission). Conversely, if a WCD is operating with a narrower bandwidth audio signal, it may be assigned a narrower RF bandwidth for each time period as compared to the RF bandwidth assigned during communication of the wider-bandwidth audio signal.

The present method will be further described by way of example with reference to orthogonal frequency-division multiplexing (OFDM) communications, such as those communication used with LTE-based systems. However, it should be understood that the method can also apply with respect to other families of protocols now known or developed in the future.

Figure 4:
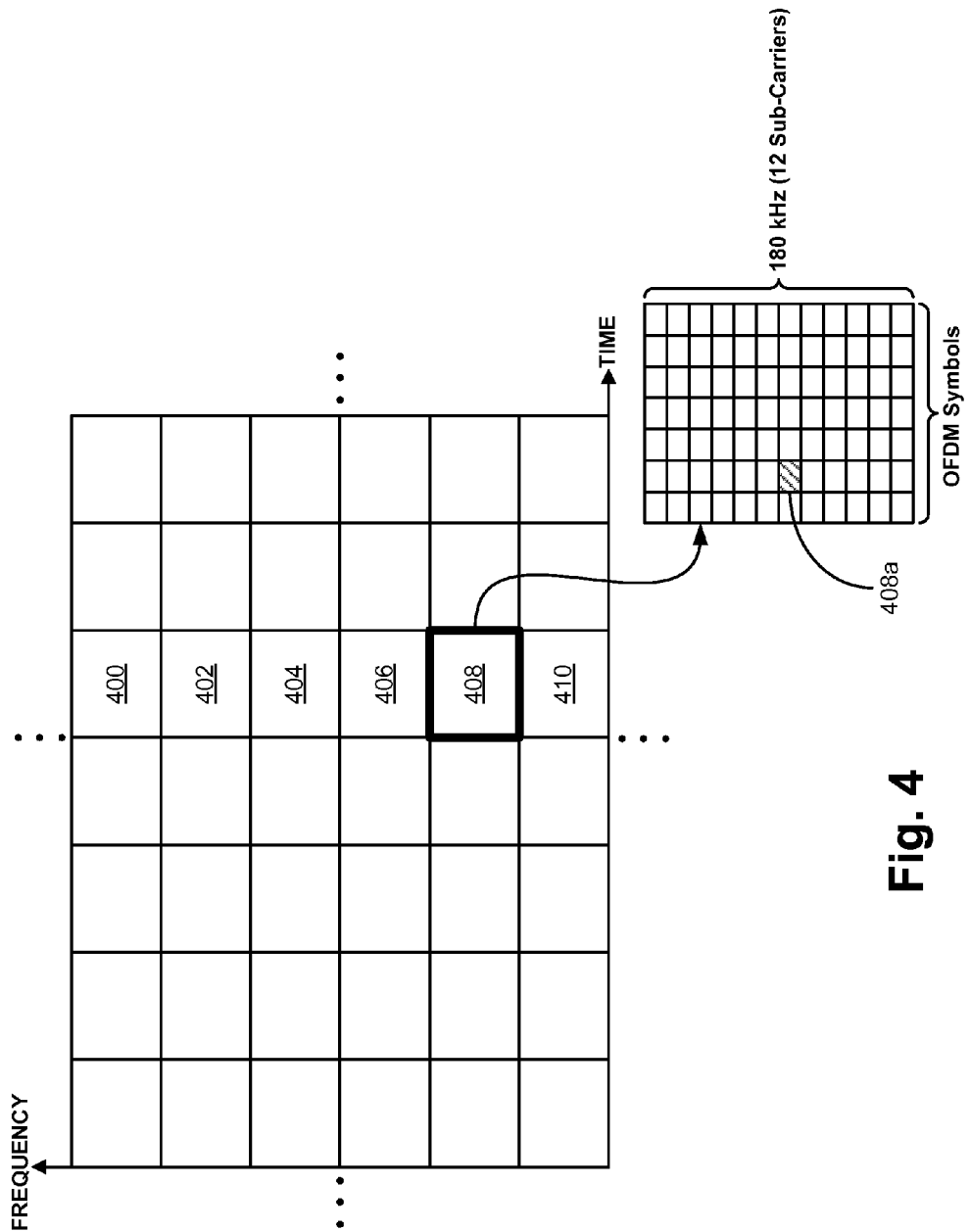
FIG. 4 is a conceptual illustration of a division of network resources into resource blocks.

FIG. 4 illustrates how the resources in a given wireless coverage area may be divided in time and frequency domains into resource blocks. In an LTE air interface, data is transmitted on both the uplink and the downlink in the form of OFDM symbols. Each OFDM symbol is formed from a plurality of sub-carriers, typically 12 sub-carriers, each with a bandwidth of 15 kHz. Thus, a resource block corresponds to a plurality of sub-carriers that are used to form an OFDM symbol and has a duration that can accommodate a particular number of OFDM symbols (e.g., seven OFDM symbols). Resource blocks similar to those of FIG. 4 may be assigned to either the uplink or downlink communication.

In the time domain, each resource block typically occupies a slot of time. By way of example, FIG. 4 shows resource blocks 400-410 for a particular slot. In the frequency domain, each of resource blocks 400-410 occupies a respective portion of frequency bandwidth, typically 180 kHz in LTE implementations. Although FIG. 4 shows six resource blocks in each slot, a wireless coverage area could have a greater number of resource blocks, as indicated by the dots above and below resource blocks 400-410.

FIG. 4 also includes a more detailed view of a resource block 408. This detailed view shows that the 180 kHz of frequency bandwidth corresponds to 12 sub-carriers of 15 kHz each. Further, in this example, the slot of time corresponds to the duration of OFDM symbols. Thus, a resource block may be described as a set of resource elements, with each resource element corresponding to one modulated sub-carrier in an OFDM symbol. The detailed view of the resource block 108 in FIG. 4 shows the division of the resource block into multiple resource elements, such as resource element 408a.

One or more resource blocks may be allocated to a particular WCD to transmit data to the WCD in the downlink channel. The frequencies that makeup the resource blocks allocated to the WCD define the RF bandwidth of the communication to the WCD. For example, resource blocks 400 and 402 might be allocated to WCD 16, resource blocks 404-408 might be allocated to WCD 16, and resource block 410 might be allocated to a different WCD. The allocation of resource blocks to WCDs could be made by BS 18 or by some other entity in RAN 12.

BS 18 may periodically evaluate, and potentially adjust, the allocation of resource blocks (or resource elements) to the various WCDs served by BS 18. This evaluation may occur every subframe, wherein a subframe consists of two consecutive slots. Thus, when a WCD is allocated one or more resource blocks, that allocation may be maintained throughout a subframe (two consecutive slots). In subsequent subframes, the WCD may be allocated a different number of resource blocks. In some embodiments, the BS 18 may allocate individual resource elements to WCDs on a per-subframe basis. The disclosure generally discusses the BS 18 assigning resource blocks to WCDs; however, it is equally applicable to embodiments where the BS 18 can assign individual resource elements to WCDs.

The resource blocks may be assigned based a requested data rate of the communication between the respective WCD and the BS 18. The number of resource blocks allocated to a respective WCD for the duration of a particular subframe may be increased in response to a request to increase the data rate to the requested data rate for the communication between the respective WCD and the BS 18. Additionally, the resource blocks allocated to a respective WCD may not necessarily be adjacent resource blocks (e.g., the resource blocks may have a frequency separation from each other). Conversely, the number of resource blocks allocated to a respective WCD for the duration of a particular subframe may be decreased in response to a request to decrease the data rate to the requested data rate for the communication between the respective WCD and the BS 18.

Thus, during a communications session between a WCD and a BS, the RF bandwidth of the communication may change based on the assignment of resource blocks to the WCD by the BS. Further, the assignment of resource blocks to the WCD may be based at least in part based on a requested data rate for the WCD.

5. Example Audio Bandwidth

The WCD uses an audio codec to convert received data into an audio signal. The WCD and/or the BS can vary the audio bandwidth of the codec during a communication session. As previously discussed, when transmitting audio data to or from a WCD, the amount of data transmitted corresponds in part to the audio bandwidth of the transmitted audio. Thus, as the audio bandwidth is increased, more data will generally be transmitted (e.g., the WCD transmits with a higher data rate). However, if the transmitted data has an audio bandwidth significantly larger than the frequency components of the transmitted audio, much of the transmitted data will be wasted, causing an inefficient transmission. In this situation, a transmission of the audio data with a narrower audio bandwidth would be more efficient. Alternatively, if the transmitted data has a narrower audio bandwidth than the audio signal, a portion of the audio will not be transmitted.

Figure 5:
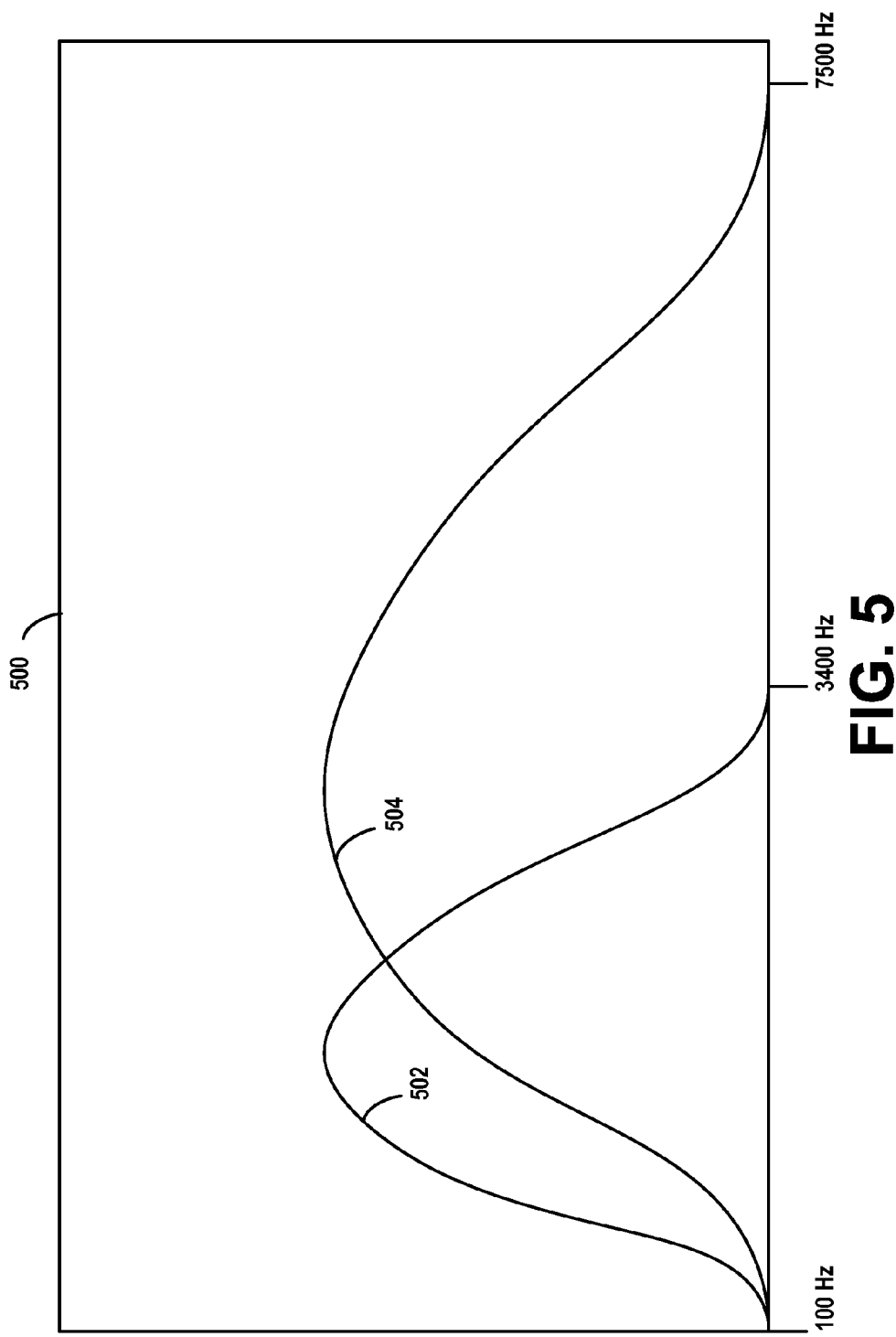
FIG. 5 illustrates an example frequency spectrum corresponding to voice and/or audio data received by a WCD.

FIG. 5 illustrates an example frequency spectrum 500 corresponding to voice and/or audio data received by a WCD. The example frequency spectrum 500, also known as a bandwidth, begins at about 100 Hertz (Hz) and ends at about 7,500 Hz. Frequency spectrum 500 is simply one example of possibly frequency spectrums that may be used in the present disclosure. In other embodiments, a different frequency range may form frequency spectrum 500. Typically, humans have the ability to hear frequencies between about 20 Hz and 20,000 Hz. However, sounds of interest primarily have frequency components between 100 Hz and ends at about 7,500 Hz. For example, the majority of the audio frequencies that make up a human voice are between 100 and 3,400 Hz.

Conversely, musical instruments often have a wider frequency spectrum with majority of the audio frequencies between 20 Hz and 20,000 Hz. Thus, depending on the specific sound, the audio bandwidth of frequencies that make up a sound may vary.

As previously stated, the human voice generally has frequency components between 100 Hz and about 7,500 Hz with the majority of the audio having frequencies between 100 and 3,400 Hz. Thus, an audio bandwidth of 100 Hz and 3,400 Hz on a WCD will be able to transmit a majority of the frequency components of the human voice. Audio bandwidth 502 of FIG. 5 shows an audio bandwidth corresponding to 100 Hz and 3,400 Hz. Human voice transmitted with audio bandwidth 502 will typically be readily audible by a receiver of the transmission. However, when the WCD transmits human voice is with audio bandwidth 502, the WCD does not transmit the voice data that corresponds to frequencies outside of the audio bandwidth 502 (e.g., the frequencies above 3,400 Hz). Audio bandwidth 504 corresponds to a bandwidth of 100 Hz to 7,500 Hz. The audio bandwidth 504 will capture more audio frequencies. Thus, a human voice transmitted with the wider audio bandwidth 504 will more closely represent the actual voice. Therefore, a recipient of a transmission encoded with audio bandwidth 504 may perceive the received audio as sounding better (e.g., more natural).

Music typically has a much wider audio bandwidth than human speech. Musical instruments generally have frequency components of an audio bandwidth on the order of the frequency range of human hearing (e.g., musical instruments have a frequency range of about 20 Hz and 20,000 Hz). Because of the larger audio bandwidth of musical instruments, for music to be transmitted and retain fidelity, a wide audio bandwidth is general desired. Similar to above with the human voice, a recipient of a transmission will perceive the received audio as sounding better when the audio has an audio bandwidth corresponding to audio bandwidth 504 rather than audio bandwidth 502. In fact, the perceived degradation in audio quality from transmitting with a narrow audio bandwidth may be more pronounced with music (or other wider bandwidth audio information) as compared to human voice.

6. Example Operation

Figure 6:
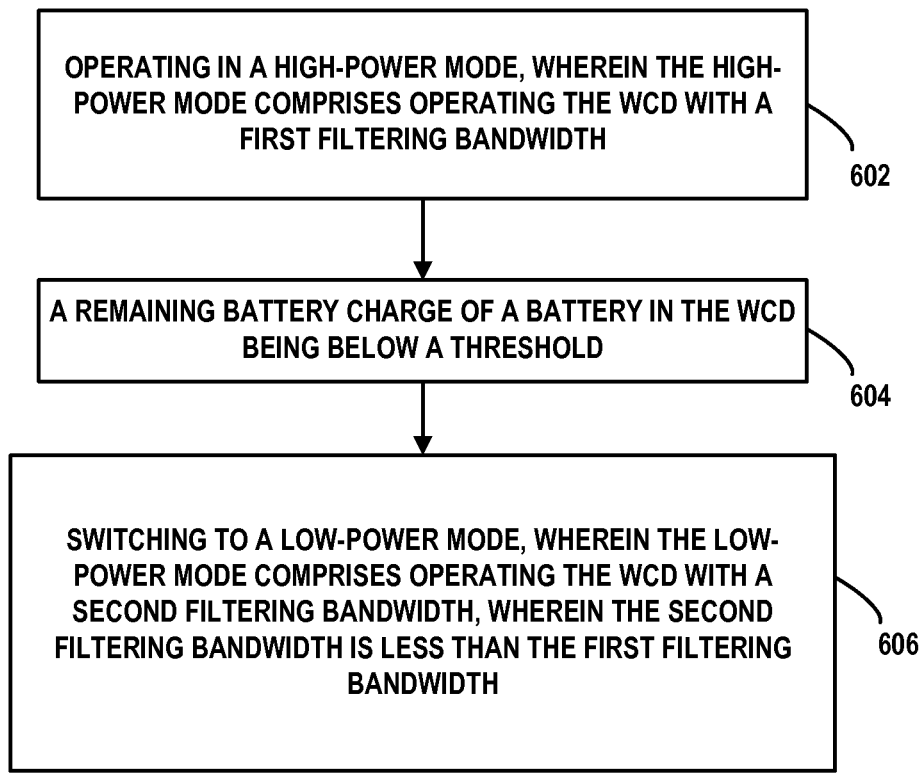
FIG. 6 is a flowchart of a method for changing the operating mode of a WCD.

FIG. 6 is a flow chart depicting functions that can be carried out by a WCD in accordance with at least one embodiment. The method of FIG. 6 may be performed while the WCD transmits and receives information during an ongoing communication session or the method of FIG. 6 may be performed while the WCD operates in an idle mode.

As shown in FIG. 6, the flowchart begins at block 602, where the WCD operates in a high-power mode. As previously discussed, while in the high-power mode, the WCD operates with a filtering component of the WCD having a first filtering bandwidth. The first filtering bandwidth may correspond to operating the WCD in a mode with an audio codec having an audio bandwidth such as the wide bandwidth 504 of FIG. 5. While operating in the high-power mode, the WCD generally uses a wide-band audio codec and provides an audio signal with a high perceived quality to an operator of the WCD. In some embodiments, the WCD may default to operating in the high-power mode.

At step 604, a remaining battery charge of a battery in the WCD being below a threshold indicates the WCD should switch to a low-power mode. Because when operating in the low-power mode the WCD operates with a narrower filtering bandwidth (and corresponding narrower audio bandwidth) than when operating in the high-power mode, the WCD can turn off a subset of filters in a filtering unit. By turning off filters in the filtering unit, the WCD can conserve power.

For example, in some embodiments, the WCD may determine the remaining battery charge at a given point in time by determining the percentage of the charge that remains or that has been used, the total amount of charge that remains or that has been used, or the expected remaining battery life (e.g., time until the battery is fully drained). In additional embodiments, the WCD may determine the remaining battery charge based on a voltage of the battery. As a battery charge decreases, the battery voltage may decrease at the same time. Other examples are also possible.

As previously discussed, in one embodiment, the WCD may switch modes based on a remaining battery charge in the battery of the WCD. Thus, the WCD will switch to the second mode with the narrower filtering bandwidth in an attempt to preserve the remaining battery charge. In another embodiment, the WCD may receive an instruction to switch to the second mode. In this embodiment, receiving the instruction to switch to the second mode causes the WCD to switch modes. For example, the WCD may have a user-controlled toggle configured to allow a user of the WCD to instruct the WCD to switch between the first mode and the second mode. The WCD may present the toggle to a user of the WCD through a display of the WCD. The toggle may indicate that it functions to switch the WCD from high-power mode to low-power mode. In another example, the RAN may communicate a signal to the WCD to switch between the high-power mode and low-power mode. The WCD will switch modes based on the switching signal from the RAN.

In some embodiments, the WCD also includes an override indicator that effectively prevents the WCD from switching to the low-power mode. When the WCD has the override indicator present, the WCD operates in the high-power mode regardless of either the battery charge or receiving a switching instruction. Thus, the override indicator forces the WCD to operate in the high-power mode. In one example, a user may indicate a desire to operate the WCD in the high-power mode through a toggle on the WCD, similar to the previously discussed toggle. When the user selects the high-power mode via the toggle, the WCD creates the override indicator.

In another example, the override indicator indicates an application running on the WCD has an associated QOS requirement greater than a threshold. If the QOS requirement is less than the threshold, the override indicator is not created by the WCD. Various applications that the WCD may execute, such as games, movies, video conferencing, etc., have an associated QOS requirement to ensure that audio components of the application are delivered with a desired quality. The QOS requirement ensures the RAN delivers audio to the WCD with the wide-bandwidth codec. The override indicator prevents the WCD from switching modes and degrading the audio performance of the application with the QOS requirement.

In practice, at block 606, in response to receiving the instruction to switch to the second mode, the WCD will switch to the second mode with the narrower filtering bandwidth. While operating in the low-power mode, the WCD operates with a second filtering bandwidth and an associated a second audio codec. The second audio codec generally provides a lower quality audio signal than the first audio codec, based on the second audio codec having a narrower audio bandwidth than the first audio bandwidth.

When the WCD switches to the low-power mode, the filtering component located in a receiver of the WCD, narrows its filtering bandwidth. To adjust (e.g., narrow) a filtering bandwidth of the filtering component, the WCD may selectively enable or disable at least one of multiple filters contained within the filtering component. When the filtering bandwidth is narrowed (e.g., the WCD switches to operating in the low-power mode), the WCD may responsively disable a subset of the filters contained within the filtering component. Because each enabled filter consumes battery power, disabling a subset of the filters helps to conserve WCD battery life (i.e., when filters are disable, the WCD operates in a low-power mode).

Further, when the WCD switches modes, the WCD may communicate a network indicator to the RAN. The network indicator may be communicated along with other reference signals that the WCD communicates to the RAN. Specifically, the network indicator may indicate parameters of the operation mode of the WCD. These parameters may include a filtering bandwidth of the WCD and an audio bandwidth of the WCD.

When the WCD communicates the network indicator to the RAN, the RAN will know the current operation mode of the WCD. Once the RAN knows the operation mode of the WCD (and the associated parameters), the RAN may provide an appropriate signal to the WCD for the current operating mode. A signal may be compatible with the operating mode of the WCD if both (i) the RF bandwidth of the signal is less than or equal to the filtering bandwidth of the WCD and (ii) the audio bandwidth of the audio in the transmission is less than or equal to the audio bandwidth of the current mode of the WCD. If the WCD did not communicate the network indicator to the RAN, the RAN may not be able to determine the RF bandwidth and/or appropriate codec for communication.

In order to provide a signal that is appropriate for the operation mode of the WCD, the RAN may transcode the data for transmission to the WCD. By transcoding the data, the RAN may compress or optimize the data so it can be transmitted within an RF bandwidth that is less than or equal to the filtering bandwidth of the WCD. In one example, a RAN may be transmitting a signal to the WCD with a wide RF bandwidth. The wide RF bandwidth allows the RAN to communicate a wide-bandwidth audio signal as the data. When the RAN receives the network indicator from the WCD telling the RAN that the WCD is switching to low-power mode, the RAN may responsively transcode the signal to a signal that may provide for communication when the WCD is in low-power mode. The transcoding may include transmitting the data with a narrower RF bandwidth. Because the narrow RF bandwidth may not support a data rate required to transmit the wide-bandwidth audio signal, the transcoding may also include converting the wide-bandwidth audio signal to a narrow-bandwidth audio signal. Thus, after the WCD communicates the network indicator to the RAN, the RAN will provide a signal to the WCD that provides for communication while the WCD is in a low-power mode.

Additionally, the above procedure may be modified based on the WCD communicating a network indicator to the RAN that communicates the WCD switched to a high power mode. When the WCD switches to the high power mode, the wider RF bandwidth (and wide-bandwidth audio signals) may be used in communication between the RAN and the WCD. Therefore, the previously discussed transcoding may be stopped when the network indicator communicates the operation of the WCD in high-power mode.

6. Conclusion

Various exemplary embodiments have been described above. Those skilled in the art will understand, however, that changes and modifications may be made to these embodiments without departing from the scope of the claims.

We claim:

1. A method carried out by a wireless communication device (WCD), comprising:
   the WCD operating in a high-power mode, wherein operating in the high-power mode comprises operating with a filtering component of the WCD filtering a received radio signal based on a first filtering bandwidth; and
   in response to a remaining battery charge of a battery in the WCD being below a threshold, the WCD switching to operate in a low-power mode by disabling at least one filter of the filtering component, wherein operating in the low-power mode comprises operating with the filtering component of the WCD filtering the received radio signal based on a second filtering bandwidth rather than the first filtering bandwidth, wherein the second filtering bandwidth is less than the first filtering bandwidth.

2. The method of claim 1, wherein operating in the high-power mode further comprises operating with a first audio codec having a first audio bandwidth and wherein operating in the low-power mode further comprises operating the WCD with a second audio codec having a second audio bandwidth rather than operating with the first audio codec having a first audio bandwidth, wherein the second audio bandwidth is less than the first audio bandwidth.

3. The method of claim 1, further comprising in response receiving an instruction to switch to a low-power mode, the WCD switching to operating in the low-power mode.

4. The method of claim 3, wherein receiving the instruction to switch the WCD to the low-power mode comprises receiving the instruction via a user interface of the WCD.

5. The method of claim 1, further comprising the WCD communicating a network indicator to a wireless base station in response to the WCD switching to the low-power mode, wherein the network indicator provides the wireless base station with an indication that the WCD is operating with the second filtering bandwidth.

6. The method of claim 1, wherein the switching to a low-power mode is performed during an ongoing communication session of the WCD.

7. The method of claim 1, further comprising:
   the WCD detecting an override indicator; and
   in response to detecting the override indicator, the WCD operating the high-power mode regardless of the remaining battery charge.

8. The method of claim 7, wherein the override indicator is based on a quality of service requirement of an application executed by the WCD.

9. A method carried out by a wireless communication device (WCD), comprising:
   the WCD operating in a high-power mode, wherein operating in the high-power mode comprises operating with a filtering component of the WCD filtering a received radio signal based on a first filtering bandwidth;
   the WCD making a battery-life determination comprising a determination that a remaining battery charge of the WCD is less than a threshold battery charge;
   the WCD making a quality-of-service (QOS) determination comprising a determination that a QOS requirement for an application executed by the WCD is less than a threshold QOS; and
   in response to making both the battery-life determination and the QOS determination, the WCD switching to operate in a low-power mode, wherein operating in the low-power mode comprises operating with the filtering component of the WCD filtering the received radio signal based on a second filtering bandwidth rather than the first filtering bandwidth, wherein the second filtering bandwidth is less than the first filtering bandwidth.

10. The method of claim 9, further comprising the WCD communicating a network indicator to a wireless base station in response to the WCD switching to operating in the low-power mode, wherein the network indicator provides the wireless base station with an indication that the WCD is operating with the second filtering bandwidth.

11. The method of claim 9, wherein operating in the high-power mode further comprises operating with a first audio codec having a first audio bandwidth and wherein operating in the low-power mode further comprises operating with a second audio codec having a second audio bandwidth, wherein the second audio bandwidth is less than the first audio bandwidth.

12. A wireless communication device (WCD), wherein the WCD initially operates with a filtering component of the WCD filtering a received radio signal based on a first bandwidth, the WCD comprising:
- a wireless-communication interface comprising the receiver;
- a processor; and
- data storage containing instructions executable by the processor for carrying out functions, the functions including:
  - the WCD operating in a high-power mode, wherein operating in the high-power mode comprises operating with a filtering component of the WCD filtering the received radio signal based on a first filtering bandwidth; and
  - in response to a remaining battery charge of a battery in the WCD being below a threshold, the WCD switching to operate in a low-power mode by disabling at least one filter of the filtering component, wherein operating in the low-power mode comprises operating with the filtering component of the WCD filtering the radio signal based on a second filtering bandwidth rather than the first filtering bandwidth, wherein the second filtering bandwidth is less than the first filtering bandwidth.

13. The WCD of claim 12, wherein operating in the high-power mode further comprises operating with a first audio codec having a first audio bandwidth and wherein operating in the low-power mode further comprises operating the WCD with a second audio codec having a second audio bandwidth rather than operating with the first audio codec having a first audio bandwidth, wherein the second audio bandwidth is less than the first audio bandwidth.

14. The WCD of claim 12, further comprising in response receiving an instruction to switch to a low-power mode, the WCD switching to operating in the low-power mode.

15. The WCD of claim 14, wherein receiving the instruction to switch the WCD to the low-power mode comprises receiving the instruction via a user interface of the WCD.

16. The WCD of claim 12, further comprising the WCD communicating a network indicator to a wireless base station in response to the WCD switching to the low-power mode, wherein the network indicator provides the wireless base station with an indication that the WCD is operating with the second filtering bandwidth.

17. The WCD of claim 12, wherein the switching to a low-power mode is performed during an ongoing communication session of the WCD.

18. The WCD of claim 12, further comprising:
- WCD detecting an override indicator; and
- in response to detecting the override indicator, the WCD operating the high-power mode regardless of the remaining battery charge.

19. The WCD of claim 18, wherein the override indicator is based on a quality of service requirement of an application executed by the WCD.

* * * * *